United States Patent [19]
Fulkerson

[11] 3,879,019
[45] Apr. 22, 1975

[54] APPARATUS FOR ROTATABLY DRIVING LARGE CYLINDRICAL BODIES

[75] Inventor: Louis Clarke Fulkerson, Arcade, N.Y.

[73] Assignee: Airco, Inc., Montvale, N.J.

[22] Filed: Mar. 1, 1973

[21] Appl. No.: 337,268

[52] U.S. Cl. ............ 259/89; 259/DIG. 19; 214/340
[51] Int. Cl. .............................................. B01f 9/02
[58] Field of Search ...... 259/81 R, 81 A, 89, 177 R, 259/177 A, DIG. 19; 51/164; 214/340

[56] References Cited
UNITED STATES PATENTS
3,033,057   5/1962   Gray ...................... 259/177 R UX FOREIGN PATENTS OR APPLICATIONS
936,493   9/1963   United Kingdom ............. 259/177 A

*Primary Examiner*—Robert W. Jenkins
*Assistant Examiner*—Alan Cantor
*Attorney, Agent, or Firm*—Larry R. Cassett; Edmund W. Bopp; H. Hume Mathews

[57] ABSTRACT

Apparatus for effecting rotational drive of a large cylindrical body carrying a semi-fluid load therein, which load upon rotation of the body about its principal axis becomes eccentric with respect to the vertical. Means are provided for supporting the cylindrical body with its principal axis extending in a substantially horizontal direction, and include at least a pair of first and second frictional drive rollers for the body. The rollers are spaced from one another as to enable engagement with points spaced about the circumference of the cylindrical body to alternate sides of the body axis. The rollers are powered by means which provide a driving torque at the roller carrying the larger portion of the load which exceeds the torque provided at the roller which carries a lesser load. The greater torque provided to the first roller is in accordance with the increase in normal force between this roller and the contacting body, in comparison with the diminished normal force at the alternate roller, due to the eccentricity of the load. Such unequal application of torque enables use of a maximized non-slipping tangential driving force at the first roller, without consequent slippage at the second roller. Differential means are also provided which enable variations in rotational speed between the said drive rollers, so that surface irregularities in the cylindrical body do not cause slippage at one or the other of the rollers.

14 Claims, 4 Drawing Figures

APPARATUS FOR ROTATABLY DRIVING LARGE CYLINDRICAL BODIES

BACKGROUND OF INVENTION

This invention relates generally to motive systems for mechanical apparatus and more specifically, relates to a motive system for effecting rotational drive of large cylindrical bodies.

In numerous applications of industrial machinery, it is required to effect rotation of large and bulky cylindrical bodies about the axes thereof. In some instances a requirement of this type may exist, for example, where the said body is effectively a workpiece upon which mechanical operations such as welding or surface finishing are to be performed. In other instances the cylindrical object being subjected to rotation, is a container for material being processed therein. In a representative example to which the present invention thus has application, this large cylindrical body is of a tubular construction, and is utilized as a digester for industrial or municipal wastes fed into the interior of the said tube. In systems of this type, the said cylindrical container is usually very large typically, being of the order of 17 or more feet in diameter. The waste materials to be treated therein may be combined in the digester with digestion promotors, such as chemical agents which accelerate the naturally occurring digestive processes of biological agents, and the semi-liquid, or semi-fluid material contained in the digester is subjected to agitation over a period of hours or days by a continuous or semi-continuous rotation applied to the said container, which thus undergoes rotation about its principal axis.

In the past various mechanical arrangements have been used in order to provide rotation for these large bodies, as above specified. Typically, for example, a rack and pinion arrangement has been utilized, with an encircling gear being present at one or more circumferences of the said body and engaging with motor driven pinion gears which thus serve to rotate the body. While constructions of this type are basically effective for the purposes of interest, they are expensive to construct and difficult to maintain. Both of these factors therefore add materially to the cost and downtime of operations utilizing such equipment.

In principle, it would seem that simple frictional drives might be effectively utilized for the present purposes, and indeed various systems have been proposed based upon frictional drives. These systems typically have the tubular body nested between pairs of rollers with a member of each pair being spaced on alternate sides of the body axis, and contacting a rim or other suitable portion of the body. The rollers may be driven by any convenient motive source, and serve to thus rotate the body. Unfortunately in those instances where, as indicated, a semi-fluid load is carried within the cylindrical body, the load will become offset from the vertical to a degree dependent upon the viscosity characteristics of the load and of the speed of rotation of the body. The net result of this process is to unbalance the load on the members of each pair of rollers. In particular, the driving roller on the "up" side of rotation for the cylinder carries an increased proportion of the total load, whereas the roller on the "down" side of cylinder rotation carries a lesser fraction of the said load. Since the heretofore contemplated arrangements provided for equal distribution of torque to each of the said member rollers, the roller carrying the lesser load (being thereby subjected to a lesser normal force between it and the load) would exert a tangential force against the cylinder body exceeding the force of friction at the interface, whereby slippage would occur with consequent damage to the roller or the adjoining portions of the cylinder.

The frictional drive arrangement set forth in the preceding paragraphs, furthermore, have yet an additional drawback tending to impair operation of the system. In particular, such systems have commonly had the rollers mechanically linked thereby forcing them to travel at the same speed. Since the cylindrical bodies being driven by said rollers tend to be somewhat irregular in geometry and to possess surface flaws or defects, it is not generally true that each roller can rotate at precisely the same speed without slippage occurring. When slippage occurs, one roller is doing all the work and is also working against the other roller. This situation requires that each roller and its associated parts be mechanically strong enough to handle the entire load. This causes added expense and the slipping causes damage to the workpiece as well as the rollers.

In accordance with the foregoing, it may be regarded as an object of the present invention, to provide a motive system for effecting rotational drive of large cylindrical bodies by frictional drive of the said bodies through roller contact, which system ensures low wear rates between the engaging drive surfaces and which does not require each roller to be mechanically capable of bearing the entire load.

It is a further object of the present invention to provide a frictional drive system for rotation of large tubular members capable of carrying semi-fluid eccentric loads, which system by enabling suitable division of torque to the drive rollers and by permitting speed variations therebetween, avoids the possibility of slippage between said rollers and the body being rotated, thereby minimizing wear and damage to the drive rollers, and to the driven cylinder and reducing the mechanical strength requirements on the rollers.

Summary of Invention

Now in accordance with the present invention, the foregoing objects, and others as will become apparent in the course of the ensuing specification, are achieved by means of one or more pairs of spaced roller bodies, which frictionally engage a rim or other suitable circumferential surface of a cylinder being driven thereby, each said roller pair being driven by common means which divides the input power between each member of the pair in accordance with the load carried by each member -- so as to assure that slippage will not occur between either member and the contacting surface of the cylinder. The said rollers are driven in such manner that a differential in the rotational speed thereof is possible, thereby assuring that slippage does not occur in consequence of differences in the travel speed of the workpiece at each roller. In a typical system in accordance with the invention, a roller pair is driven by hydraulically actuated motors, the fluid pressure for which may be provided by a common hydraulic pump. In one version of the present invention, a fixed division of torque may be provided between rollers in a pair, which division is based upon parameters derived from the known characteristics of the load being carried in the cylinder. In a more sophisticated embodiment of the invention, load sensors such as solid state piezoelectric cells or similar dependable and compact elements, may be provided for determining what portion of the total load is present at each roller member of the driving pair. The division of driving torque may then be suitably adjusted in accordance with the load division requirements, to assure proper distribution of power.

BRIEF DESCRIPTION OF DRAWINGS

The invention is diagrammatically illustrated, by way of example, in the drawings appended hereto, in which.

DESCRIPTION OF PREFERRED EMBODIMENT

Figure 2:
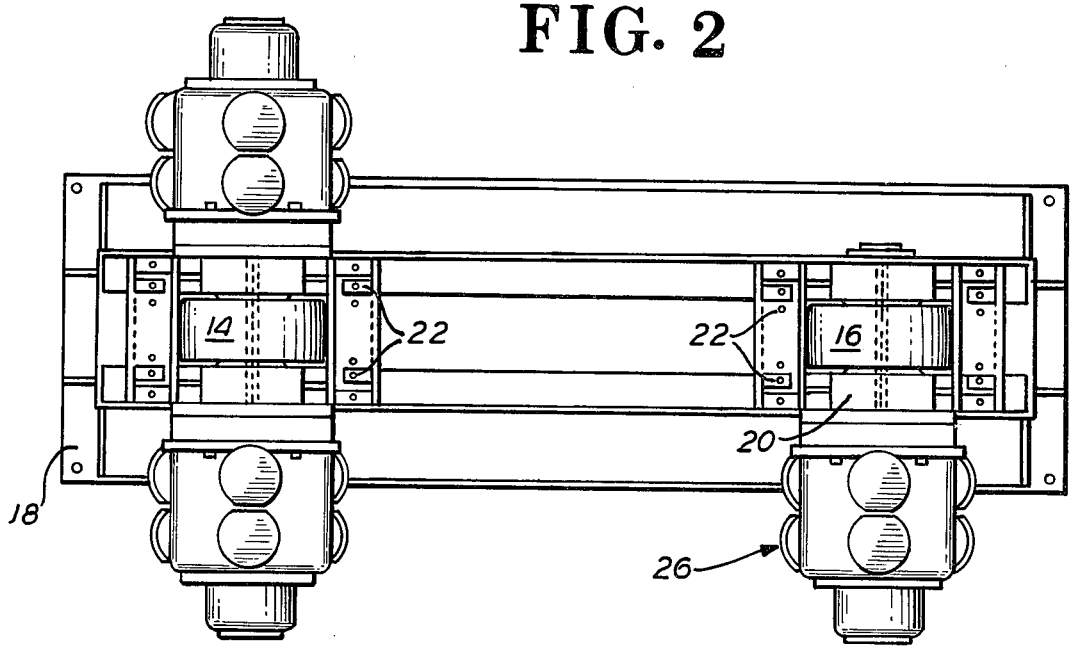
FIG. 2 is a top plan view of the FIG. 1 apparatus.
Figure 1:
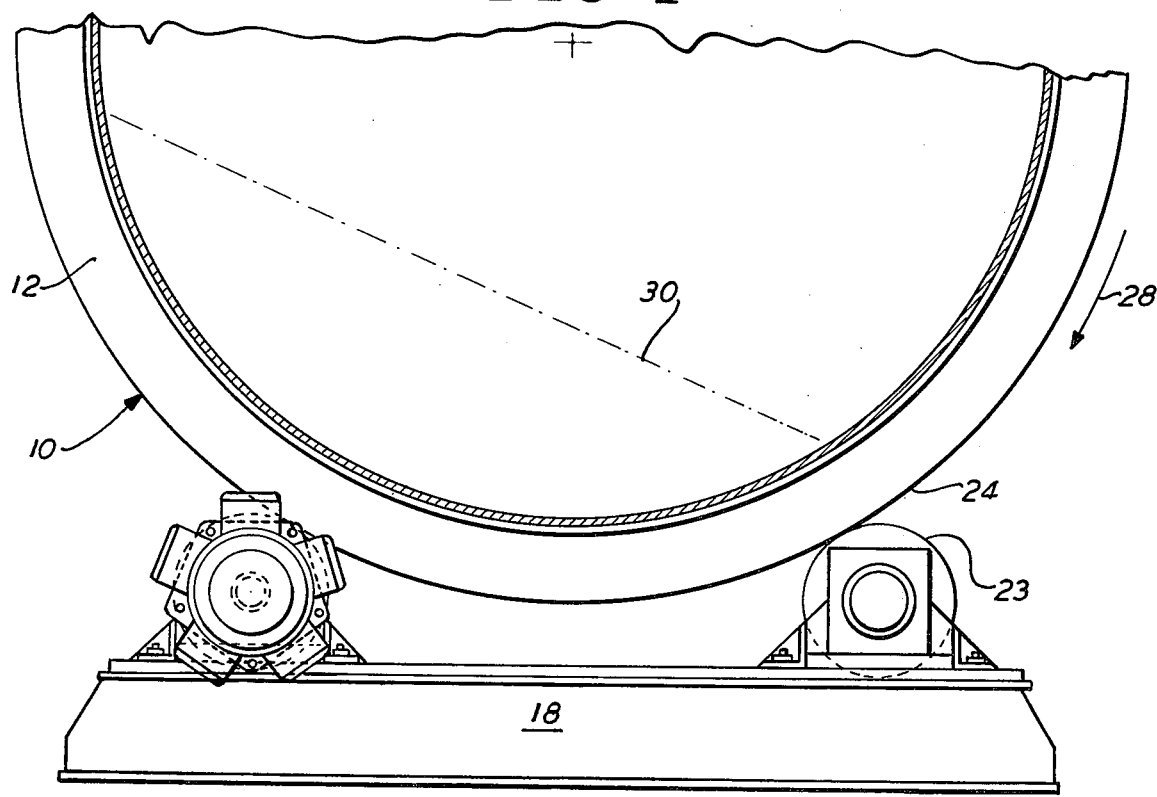
FIG. 1 is an end elevational view of a motive system in accordance with the present invention, engaged in driving of a representative, large cylindrical body.

In FIGS. 1 and 2 herein, elevational and top plan views appear of portions of a driving system in accordance with the present invention. Referring particularly to FIG. 1, there is seen in cross-section a bottom half of a large cylindrical body 10, which may be regarded as comprising a rotary digester, i.e., a tank-like device well-known for use in the treatment of refuse, sewage, industrial wastes and other materials. Although not per se part of the present invention it may be noted that such digester devices are very large cylindrical apparatus, often being 15 to 20 feet in diameter, and of the order of 250 feet, or so long, such devices being capable of processing of the order of 10,000 cubic feet of semi-fluid material per day. Devices of this type are typically used by feeding in the raw material to be processed at one end of the large cylindrical tank-like body, and after subjecting the semi-fluid material to treatment for a period of hours to days, discharging the effluent at the opposite end thereof. The principal axis of the body, although substantially horizontal, may be slightly tilted to enable this end-to-end flow through the digester.

In the present instance the cylindrical body 10 is seen to be provided with a rim 12. Such rim has a hard metallic surface which is frictionally engaged by driving rollers 14 and 16.

The said rollers 14 and 16 are mounted upon a generally rectangular base 18, which base may be one of two or more positioned along the body 10. More specifically, it is seen that a bearing housing 20 is secured to base 18 by bolts 22, with the rolls 14 and 16 being mounted for rotation on an axle passing through housing 20. The surfaces 23 of rollers 14 and 16 are in contact with rim 12, providing a frictional engagement for causing rotation of the body 10.

The axle effecting rotation of rollers 14 and 16 is driven by one or more hydraulic motors 26. In accordance with the present invention such hydraulic motors may constitute well-known devices of this type, which are driven from a hydraulic power reservoir (shown in connection with FIG. 3) which reservoir supplies driving power for the several hydraulic motors 26 utilized. These motors may be of variable displacement type, with varying torque as required, being enabled in accordance with the displacement stroke of the said motors. For purposes of the present illustration, however, such motors are of fixed displacement, devices of this type being, for example, available from the Hydraulics Division, Houdaille Industries, Inc., under Model designations such as 47D373-S1S.

In accordance with a preferred mode of operating the present apparatus, it will be seen that at the right side of FIGS. 1 and 2 a single motor 26 is provided for driving the roller 16. At the left-hand side of the drawing it will be noted that a pair of such motors 26 are provided. In accordance with the present invention it is contemplated that body 10 will be rotated in the direction indicated by arrow 28. Under such conditions it will be evident that if a semi-fluid mass is present within the cylinder 10, it will assume a somewhat eccentric position, as is suggested by the dotted line 30 representing the approximate upper surface of such mass. It is evident that the precise degree of eccentric displacement of the mass will vary in accordance with the viscous characteristics of the mass, as well as with the rate of rotation of cylinder 10. In an application such as that presently contemplated, i.e., a waste digester, wherein it is believed the invention has particular advantageous use, the rate of rotation and the viscosity characteristics of the material will be known, and therefore the eccentricity in a given application will be a predetermined value. It is also clear that with the direction of rotation as shown, the weight distribution due to eccentricity of the load requires roller 14 to carry a larger fraction of the load than roller 16.

Because of the difference in weight borne by the roller 14 or 16, it will further be evident that the maximum tangential force which may be applied at the interface of roller 14 and rim 12, without causing slipping exceeds that possible in the case of roller 16. This is because the tangential force that may be applied without slippage occurring is equal to the product of the coefficient of friction and the normal force between body 10 and the particular roller at the point of contact. Such product will be clearly larger in the case of roller 14 than of roller 16. Accordingly, it is evident that the maximum force possible at roller 14 without slippage would, if it were also applied at roller 16, where a lower normal force is present, cause slippage and consequent damage to the roller and/or the contacting rim 12. In accordance with the present invention this possibility is precluded by utilizing a lower torque at roller 16 than at roller 14. In the embodiments shown in FIGS. 1 and 2 this is accomplished in a most simple and expeditious fashion. In particular it is seen that a pair of motors 26 are provided for roller 14, whereas but a single motor 26 is provided for roller 16. Since, as will be seen in connection with FIG. 3, a common power source provides common hydraulic pressure to each of the motors, a simple 2:1 torque ratio exists between roller 14 and roller 16.

Figure 3:
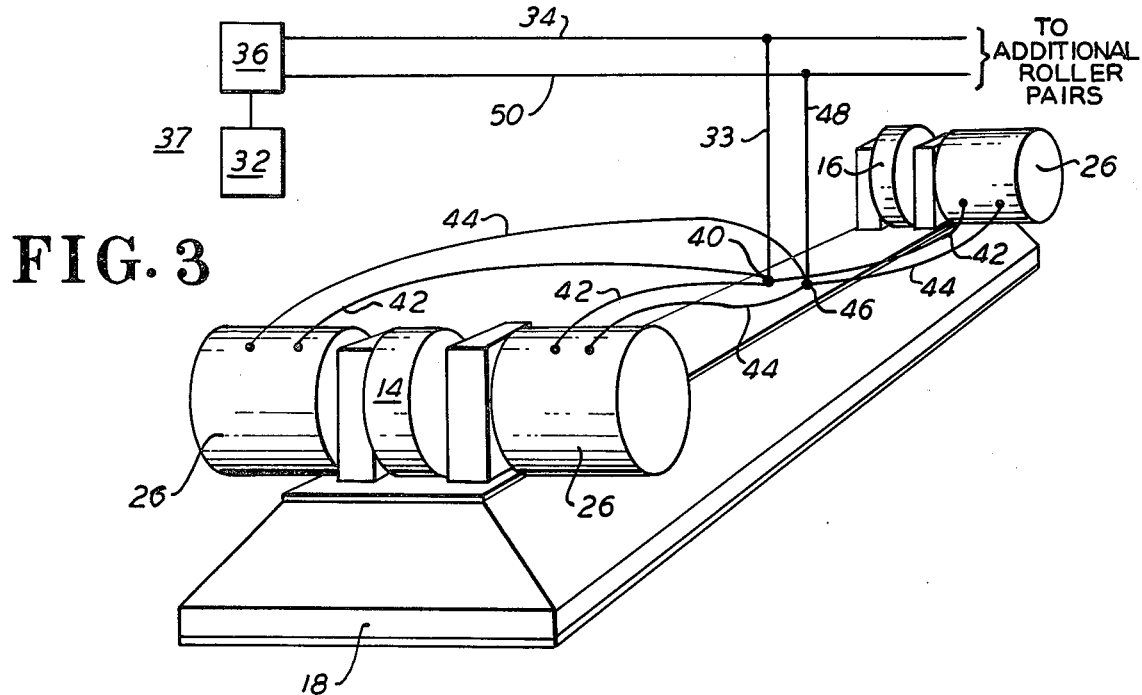
FIG. 3 is a perspective, schematic view of the drive system, including the hydraulic reservoir and hydraulic motors utilized in association with the present system.

This point will become more evident in considering FIG. 3, wherein an hydraulic power system 37 is schematically shown, which comprises a pump 36 of the variable displacement axial piston type and a reservoir 32.

FIG. 3 shows a base 18 which is essentially the same as that described in connection with FIGS. 1 and 2. A pair of hydraulic motors 26 are shown powering roller 14, driving the "up" side of cylinder body 10, with a single motor 26 driving the "down" side. In the case of each hydraulic motor, the operating power therefor is provided from pump 36 via common hydraulic supply line 34 and conduit 33. Conduit 33 connects to a manifold 40. Hoses 42 then convey fluid from the manifold 40 to the several motors with outlet hoses 44 then returning the hydraulic fluid back to a return manifold 46. The fluid from return manifold 46 passes through exhaust conduits 48 and 50 back to the pump. Additional fluid may be collected in a case drain and returned to the reservoir through other lines not shown.

Lines 34 and 50 are shown as supplying separate pairs of rollers (not shown) which are substantially identical to the pair illustrated; however, there is no reason why the torque ratios on such other pairs need be in the same 2:1 ratio. It is also noted that the fluid travelling to and from the hydraulic power system 37 may be caused to travel through filters.

As is well-known the torque in hydraulic motors is determined in accordance with the pressure of the input fluid, and assuming that hydraulic pressure in the present instance is equal to all motors 26, it will be evident that the torque in the arrangements shown will be divided on a 2:1 basis between roller 14 and roller 16. The speed of rotation of each motor is a function of the volume of hydraulic fluid delivered to the motor, and since a common reservoir is utilized for all the motors, it will be clear to those familiar with the art of hydraulics that an automatic adjustment is provided for the difference in speeds which may occur between rollers 14 and 16 (and also to such additional rollers as which are also powered from the same hydraulic power source). Therefor, if one roller runs slightly slower or faster, e.g., because of irregularity or so forth at such surface, a proportionally lesser or greater amount of fluid will be provided. In this same connection, however, it will be evident that the invention is not in any way limited to hydraulic motors and power sources, but other known driving systems may be utilized wherein differential speeds are enabled, and proper torque division is otherwise effected in any manner in accordance with the invention.

That the 2:1 division of torque is appropriate in at least one application of this invention is shown by the data contained in Tables I and II. These Tables show data concerning the turning of a waste digester as described above.

The "Fill" and "Load density" figures were selected on the basis of what operators of such digester operators have encountered in the past. In Table I the $T_h$ and $T_L$ are the tangential forces necessary at the rollers ($h$ for heavily powered and L for lightly powered) to rotate the load at a rate which will keep the surface of the semi fluid load at approximately 45° to the horizontal. Fills above 50 for percent were not considered or above this point the degree of eccentricity starts to lessen. This is apparent if you consider that a 100 percent fill would not have any eccentricity at all.

The $T_h$ and $T_L$ figures are always in the designed 2:1 ratio but due to the varying normal force exerted by the load (i.e., container plus fill) at the two rollers the amount of traction, i.e., coefficient of friction, between the roller to get this force without slippage varies. Table II lists the coefficient of friction which must be available to permit the transmittal of the force from the roller to the cylinder.

This coefficient for steel on steel could be as high as 0.5, but the most which can be relied upon is 0.25.

TABLE I

| % Fill | Load density | | | | | | | |
|---|---|---|---|---|---|---|---|---|
| | 50lbs./ft.³ | | 40lbs./ft.³ | | 35lbs./ft.³ | | 30lbs./ft.³ | |
| | $T_h$ | $T_L$ | $T_h$ | $T_L$ | $T_h$ | $T_L$ | $T_h$ | $T_L$ |
| 5 | 5,000 | 2,500 | 4,000 | 2,000 | 3,500 | 1,750 | 3,000 | 1,500 |
| 20 | 15,819 | 7,910 | 12,655 | 6,338 | 11,073 | 5,537 | 9,491 | 4,746 |
| 28 | 19,566 | 9,783 | | | | | | |
| 30 | 20,419 | 10,210 | 16,333 | 8,167 | 14,292 | 7,146 | 12,250 | 6,125 |
| 32 | 21,048 | 10,524 | | | | | | |
| 35 | 21,980 | 10,990 | 17,584 | 8,792 | 15,386 | 7,693 | 13,188 | 6,594 |
| 50 | 23,967 | 11,983 | 19,173 | 9,587 | 16,777 | 8,388 | 14,380 | 7,190 |

TABLE II

CORRESPONDING VALUES OF COEFFICIENT OF FRICTION

| | | | | | | | | |
|---|---|---|---|---|---|---|---|---|
| 5 | .11 | .08 | .09 | .07 | .08 | .06 | .07 | .05 |
| 20 | .18 | .25 | .16 | .19 | .15 | .17 | .14 | .14 |
| 28 | .18 | .24 | | | | | | |
| 30 | .18 | .24 | .17 | .20 | .16 | .18 | .15 | .16 |
| 32 | .18 | .24 | | | | | | |
| 35 | .18 | .23 | .17 | .20 | .16 | .18 | .15 | .16 |
| 50 | .16 | .18 | .15 | .16 | .15 | .15 | .14 | .14 |

None of the above data should be construed as limits on the invention for, if necessary, higher coefficients of friction can be obtained, and other ratios of torque to the rollers more appropriate in other applications.

Figure 4:
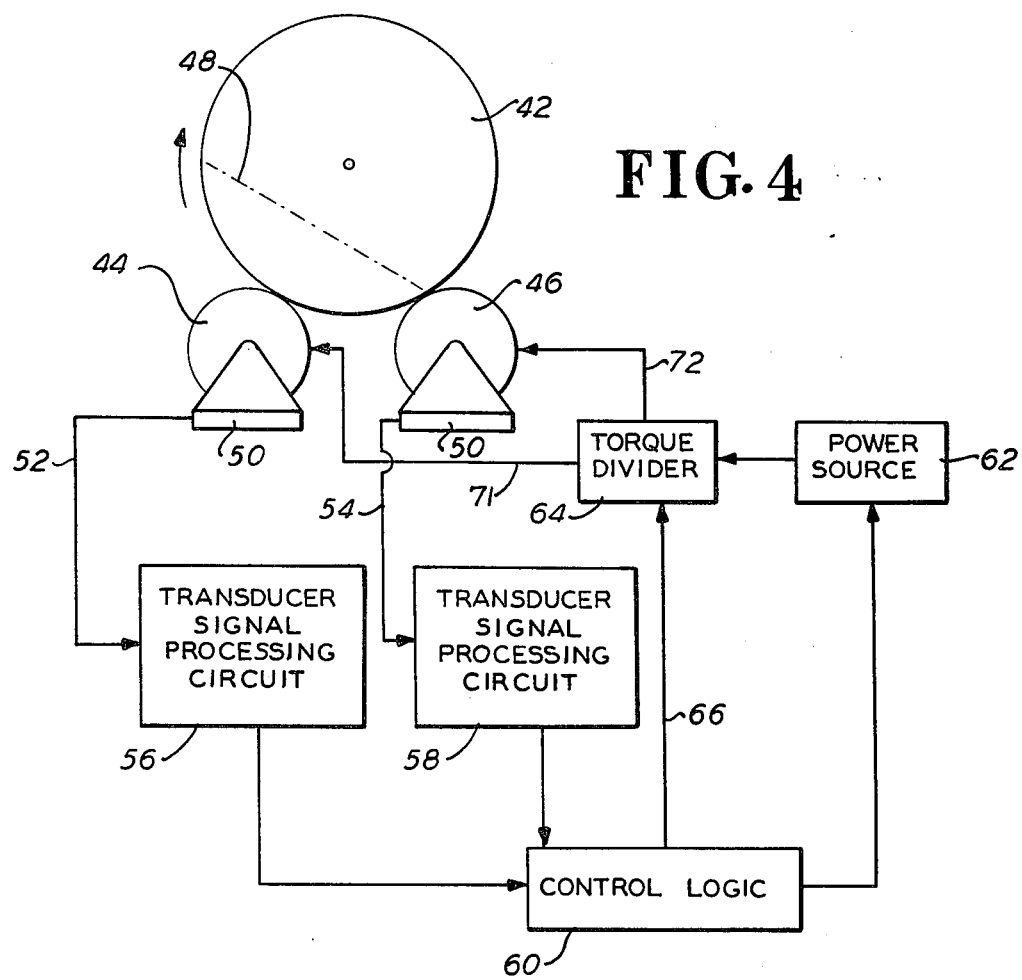
FIG. 4 is a schematic block diagram of a system in accordance with the present invention, utilizing load sensors in order to attain variable control of torque distribution in accordance with load weight and eccentricity.

IN FIG. 4, a schematic block diagram appears of a more sophisticated version of the present apparatus. In this system a body 42 is to be rotated in accordance with the invention and is shown in schematic fashion. Such body may constitute a large cylindrical digester, such as that discussed heretofore, and for purposes of simplification, a single pair of rollers 44 and 46 are shown in contact with the periphery of the body 42. In practice several pairs of such rollers, and commonly at least one additional pair, are likely to be used.

The system differs from the embodiment previously set forth, in that each roller 44, 46 is provided with a transducer such as a load cell 50, which provides a continuous signal indicative of the loading on such roller. As the eccentricity of the load, as indicated at 48 varies in accordance with the characteristics of such load and the rate of rotation of the cylinder 42, it will be evident that varying proportions of the load will be borne by one or the other of rollers 44 or 46. The transducers may constitute a simple piezoelectric element being compressed in accordance with the load, and providing an output signal via lines 52 and 54 to a pair of transducer signal processing logic blocks 56 and 58. From these blocks the said signals are in turn provided to control logic block 60, which block includes the overall control elements for the system.

Any number of other systems for accomplishing the continuous sensing of the load on each roller will occur to those skilled in the art, e.g., stain gauges are commonly used to monitor forces, but these are within the scope of this invention.

The rollers 44 and 46 may be regarded as driven by hydraulic motors as have been discussed in connection with prior embodiments. The common source as, for example, a hydraulic pump is shown at block 62. The common source then feeds through torque dividing means shown at 64, which acts in continuous or semi-continuous fashion to effect distribution of the fluid pressure to the motors driving rollers 44 and 46 via lines 71 and 72, in accordance with a control signal provided to such torque dividing means by control logic 60 via the line 66. It will thus be evident that by the present arrangement an automatic and virtually continuous variation is possible in the torque being distributed to the two rollers 44 and 46 constituting a driving pair, and in consequence thereof one may drive the cylinder 42 with a virtually complete lack of slippage, regardless of the loading conditions.

It will, of course, further be evident that simple differential means may be present for providing variation in speed between the members of the roller pairs 44, 46 in accordance with variations required by irregularities in the contacting cylinder, -- a point which has been previously discussed and which is particularly simple where the system is hydraulically driven from a common source 62.

While the present invention has been particularly set forth in terms of specific embodiment thereof, it will be understood in view of the instant disclosure, that numerous variations upon the invention are now enabled to those skilled in the art, which variations yet reside in the scope of the instant teaching. Accordingly, the invention is to be broadly construed and limited only by the scope and spirit of the claims now appended hereto.

I claim:

1. Apparatus for effecting rotational drive of a large circular body carrying a semi-fluid load therein, which load upon rotation of said body about its principal axis becomes eccentric with respect to the vertical, comprising in combination:

means for supporting said body, said means including at least a pair of first and second rollers, spaced from one another with the rotational axes of said rollers being substantially parallel to but respectively offset to opposite sides of the said axis of said body, said first and second rollers being adapted to frictionally engage said body at points spaced about the circumference of said body, said points being at respectively the upwardly advancing and downwardly advancing side of body when said body is rotated; first and second torque means to provide driving torque to said first and second rollers respectively, to unidirectionally rotate said rollers thereby causing a corresponding unidirectional rotation of said body; and said first torque means being adapted to provide driving torque at said first roller which at all times while said semi-fluid load is eccentric substantially exceeds the torque provided at said second roller; power means for energizing said torque means; and differential means connecting said power means to said torque means, whereby said first and second torque means may rotate at different speeds.

2. Apparatus in accordance with claim 1, wherein said torque means have a fixed ratio of available torque for driving said respective rollers, the division of the torque available being predetermined in accordance with the anticipated eccentricity of said load.

3. Apparatus in accordance with claim 2, wherein said torque means comprise hydraulically driven motors and said power means is a source of pressurized hydraulic fluid.

4. Apparatus in accordance with claim 3, wherein differing numbers of said hydraulic motors in tandem drive each of said rollers, the ratio of the number of said motors respectively driving said first and second rollers, being in accordance with the desired torque ratios to be provided between said rollers.

5. Apparatus in accordance with claim 1, wherein a plurality of said roller pairs are provided in underlying relationship to said body.

6. Apparatus in accordance with claim 1, further including load sensing means at each of said rollers to provide a signal output indicative of the normal force present at each said roller, means receiving said load sensing signals and providing a control signal, and a torque divider means positioned to receive said control signal and divide the power supplied from said power means between said rollers in accordance with said control signal.

7. Apparatus in accordance with claim 6, wherein said torque means includes hydraulically driven motors, and said power means includes a source of pressurized hydraulic fluid for supplying pressurized fluid to said torque means to effect a rotation of said rollers; and said torque divider means comprises means for adjusting the delivered pressure of hydraulic fluid at each of said torque means.

8. Apparatus for effecting rotational drive of a circular body carrying a load therein which is eccentric with respect to the vertical, comprising in combination:

at least first and second rollers, contacting the periphery of said body toward alternate sides of the vertical plane of symmetry thereof and at least partially supporting the weight of said body;

powering means providing driving torque to said rollers for in turn effecting rotation of said body contacting said rollers; and said powering means adapted to proportion driving torque as between said first and second rollers, in relation to the respective normal force between each said roller and the contacting cylindrical body, thereby adjusting the provided torque in accordance with the difference in said respective normal forces due to said eccentricity of said load, thereby enabling non-slipping tangential driving forces at each of said rollers.

9. Apparatus in accordance with claim 8, further including load sensing means at each of said rollers providing a signal output indicative of the respective normal force present at each said roller; means receiving said load sensing signals to provide a control signal; and a torque divider means positioned to receive said control signal and divide the torque provided at each of said rollers in accordance with said control signal.

10. Apparatus in accordance with claim 9, wherein said powering means includes a source of pressurized hydraulic fluid and hydraulical motors for receiving said pressurized fluid and effecting rotation of said rollers; and said torque divider means comprises means for adjusting the delivered pressure of hydraulic fluid at each of said motors in accordance with said control signal.

11. A method for effecting rotational drive of a large circular body constituting an eccentric load, comprising providing at least a pair of driveable support rollers at the periphery of said body frictionally contacting said body toward alternate sides of the vertical plane of symmetry thereof, whereby the normal forces present at each said roller and the contacting surface of the said body differ in accordance with the eccentricity of said load; and providing driving torque to each of said rollers to effect rotation of said cylindrical body; the torque provided to said rollers subjected to said greater normal force being at all times while said load is eccentric greater than the torque provided to said other roller, and both of said torque levels being lower than that at which slippage between said roller and said body will occur.

12. A method in accordance with claim 11, wherein the torque provided to said rollers is divided in accordance with the said respective normal forces at each said roller.

13. Apparatus for effecting rotational drive of a large circular body carrying an eccentric load therein, comprising:

at least a pair of driveable support rollers at the periphery of said body, said rollers positioned on alternate sides of the vertical plane of symmetry of said body, whereby the normal force present at the point of contact between each said roller and the surface of the body differs in accordance with the eccentricity of said load; and means for providing driving torque to each of said rollers to effect rotation of said body; the torque provided to said roller subjected to said greater normal force being at all times while said load is eccentric greater than the torque provided to said other roller, and both of said torque levels being lower than that at which slippage between said roller and body will occur.

14. Apparatus in accordance with claim 13, wherein said means providing said driving torque is adapted to divide the torque as between said rollers in accordance with the respective normal forces at each said roller.

* * * * *